United States Patent Office 3,017,331
Patented Jan. 16, 1962

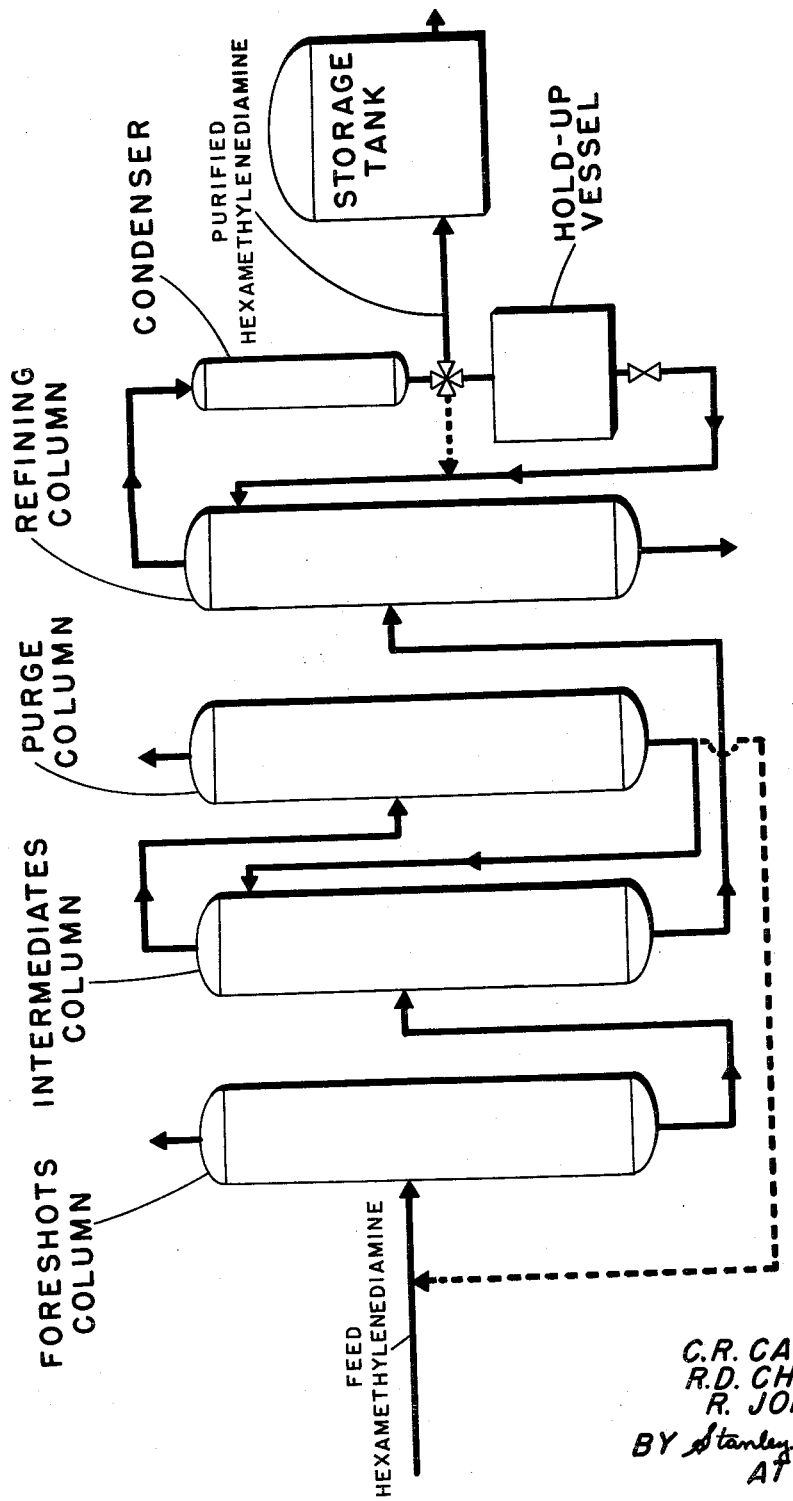

1

3,017,331
METHOD FOR THE PURIFICATION OF HEXAMETHYLENEDIAMINE
Charles R. Campbell, Richard D. Chapman, and Robert Johnson, Pensacola, Fla., assignors to The Chemstrand Corporation, Decatur, Ala., a corporation of Delaware
Filed Apr. 15, 1959, Ser. No. 806,423
3 Claims. (Cl. 202—71)

This application relates to the production of hexamethylenediamine and more particularly to a method for the refinement of hexamethylenediamine to a highly purified state.

Although there are a number of methods for the preparation of hexamethylenediamine which are known and used in industry, none of these methods results in the production of hexamethylenediamine which is free of products of side reactions and the like. Consequently, further refinement of hexamethylenediamine is generally necessary to obtain a product which exhibits the high state of purity necessary if the hexamethylenediamine is to be employed as an intermediate in other industrial processes which culminate in the production of commercially saleable articles. This is especially true, for example, in the production of polyamides wherein hexamethylenediamine is reacted with adipic acid to produce polyhexamethyleneadipamide which is used in many end products.

Utilization of poorly refined hexamethylenediamine in the production of polyhexamethyleneadipamide causes a restriction of molecular weight, results in a polymer having bad color characteristics and poor dyeability, and affects other physical and chemical properties thereof. For example, in the textile field where polyhexamethyleneadipamide is widely used in the production of filaments and fibers, the employment of poorly refined hexamethylenediamine results in weak filaments and fibers. Furthermore, rigid color specifications must be maintained in the textile field in order to obtain products which meet stringent standards with respect to dyeability and the like. Accordingly, polyhexamethyleneadipamide having good color characteristics is necessary. It is quite obvious, therefore, that only highly pure hexamethylenediamine meets the necessary requirements for the production of end products which are acceptable.

As a consequence of the need for highly purified hexamethylenediamine, methods of refinement are now used throughout industry regardless of the particular method employed in the production of hexamethylenediamine. However, although the current methods employed to refine hexamethylenediamine result in a commercially acceptable product, the problem of impurities therein still remains a cause for concern since the quality and properties of end products in which hexamethylenediamine is used as an intermediate can still be further improved by minimizing even more the impurities present in refined hexamethylenediamine.

One method for the production of hexamethylenediamine currently in wide use throughout industry is the hydrogenation of adiponitrile in the presence of a catalyst, such as cobalt. This method is carried out continuously by passing hydrogen and adiponitrile over a catalyst under pressure and at an elevated temperature. Since the reaction is exothermic, liquid ammonia is employed to absorb the heat by vaporization and also to limit to a considerable extent the formation of by-products. When the crude product is formed, it contains impurities which are removed by passing it through a refining train composed of a series of distillation stills. It has now been found, however, that even after passing through the refining train the hexamethylenediamine still contains impurities which are undesirable. It is believed that these impurities are formed both in the hexamethylenediamine production system and in the refining train.

The exact nature of these impurities is unknown. However, extensive investigation has led to the conclusion that principally they are aminohexylideneimine and the condensation products of this imine with itself and with hexamethylenediamine and other types of compounds. These impurities may generally be called polarographically reducible impurities since they give rise to unsaturated bonds reduced by the polarograph and will be so designated hereinafter in this specification and in the claims. The following diagrammatic equations show the reversible reactions of these types of compounds in hexamethylenediamine.

REVERSIBLE REACTIONS OF POLAROGRAPHICALLY REDUCIBLE COMPOUNDS IN HEXAMETHYLENEDIAMINE (1) $H_2N(CH_2)_5CH=NH \rightleftharpoons$ (5) $\begin{array}{c}-(CH_2)_5-\\ \phantom{xx}|\\ -NHCH-NH_2\end{array}$ (+hexamethyl- $\updownarrow$   (−NH$_3$) $\updownarrow$
enediamine)

(2) $H_2N(CH_2)_5CH-NH_2$   (6) $\begin{array}{c}-(CH_2)_5-\\ \phantom{xx}|\\ -NH=CH\end{array}$
$\phantom{xxxx}|$
$\phantom{xxxx}NH(CH_2)_6NH_2$ (−NH$_3$) $\updownarrow$                (+hexamethyl- $\updownarrow$
                                    enediamine)

(3) $H_2N(CH_2)_5CH$    (7) $\begin{array}{c}-(CH_2)_5-\\ \phantom{xx}|\\ -NH-CH-\end{array}$
$\phantom{xxxxx}\|$                         $\phantom{xxxxxxx}|$
$\phantom{xxxxx}N-(CH_2)_6NH_2$             $\phantom{xxxxxxx}NH$
                                           $\phantom{xxxxxxx}|$
(+hexamethyl- $\updownarrow$                $\phantom{xxxxxxx}(CH_2)_6$
enediamine)                                $\phantom{xxxxxxx}|$
                                           $\phantom{xxxxxxx}NH_2$
(4) $H_2N(CH_2)_5CHNH(CH_2)_6NH_2$
$\phantom{xxxxxxxx}|$
$\phantom{xxxxxxxx}NH(CH_2)_6NH_2$ In addition to the above-described reactions aminohexylideneimine probably undergoes an aldol type condensation to yield a complex mixture of products according to the following equations:

$2H_2N(CH_2)_5CH=NH \longrightarrow H_2N(CH_2)_5CH-NH_2$
$\phantom{xxxxxxxxxxxxxxxxxxxxxxxxxxxxxxx}|$
$\phantom{xxxxxxxxxxxxxxxxxxxxxxxxxxxxxxx}H_2N(CH_2)_4CHCH=NH$ $\phantom{xxxxxxxxxxxxxxxxxxxxxxxxxxxxxxx}\downarrow (-NH_3)$ to higher molecular weight  $\phantom{xx}H_2N(CH_2)_5CH$
resinous material by  $\longleftarrow \phantom{xxxxxxxxx}\|$
reaction continuation  $\phantom{xxxxx}H_2N(CH_2)_4C-CH=NH$ It is readily apparent that these compounds give rise to unsaturated bonds and are polarographically reducible. All are reduced by the polarograph at potentials of 1.3 to 1.5 volts. A distinct need exists in industrial processes for a method of purifying refined hexamethylenediamine to a state wherein such impurities are entirely removed or at the most reduced to negligible amounts.

Accordingly, it is a primary object of this invention to provide a method for the preparation of highly purified hexamethylenediamine. It is another object of this invention to provide a method for controlling polarographically reducible impurities in hexamethylenediamine. It is a further object of the invention to provide a method conducive to the formation of high-boiling polarographically reducible impurities in hexamethylenediamine. It is still a further object of the invention to eliminate low-boiling polarographically reducible impurities from refined hexamethylenediamine. It is still a further object of the invention to provide a method conducive to the conversion of low-boiling polarographically reducible impurities to high-boiling polarographically reducible impurities in hexamethylenediamine. Other objects and advantages of this invention will be apparent from reading the following description.

In general, the above objects are accomplished by passing refined hexamethylenediamine from a distillation column to a hold-up capacity vessel, holding the refined hexamethylenediamine in the hold-up capacity vessel for a period of time and thereafter returning the refined hexamethylenediamine to the refining column as reflux for further distillation.

The polarographically reducible compounds present in crude hexamethylenediamine are cyclic and non-cyclic compounds which may or may not be Schiff's bases as illustrated in the equations above. Reaction equilibrium tends to favor the non-cyclic state. Generally, the high molecular weight compounds have a distillation temperature higher than hexamethylenediamine and during reaction are separated therefrom by distilling the hexamethylenediamine over in the heads of the refining column and leaving the high molecular weight compound impurities as tails. The lower molecular weight polarographically reducible impurities, however, distill over with the hexamethylenediamine and contaminate the final product. Furthermore, the concentration of the high-boiling polarographically reducible compounds in the base of the refining column leads to increased generation of low-boiling polarographically reducible compounds in the refined hexamethylenediamine.

An advantage of the equilibrium illustrated in the equations above is utilized in the practice of the present invention to remove low-boiling polarographically reducible impurities by inserting the hold-up capacity vessel in the reflux line of the refining column to permit the conversion of low-boiling polarographically reducible impurities to high-boiling polarographically reducible impurities and returning the refined hexamethylenediamine as reflux to remove such impurities.

The attached drawing is a flow diagram showing one mode of practicing the invention.

One particularly useful distillation system for carrying out the purification of hexamethylenediamine and into which the present invention can be incorporated may be described as follows: Crude hexamethylenediamine containing 1,2-diaminocyclohexane, hexamethyleneimine, water, and ammonia is introduced into a packed column (foreshots column) operated at about atmospheric pressure. This generally serves to remove ammonia and most of the water as well as hexamethyleneimine which forms a low-boiling azeotrope with water. The tails from this column which still contain a small amount of water are carried to an intermediates column which is connected in series to a purge column. The intermediates column is operated under a vacuum at an absolute pressure of about 50 to 400 mm. of Hg. Most of the 1,2-diaminocyclohexane as well as any pentamethylenediamine that may be present, some of the water, and some of the hexamethylenediamine is taken over in the heads from the intermediates column to the purge column. The tails from the intermediates column which contain more purified hexamethylenediamine are passed to a refining column. The heads from the intermediates column which have been led to the purge column are concentrated therein and then returned to the intermediates column. 1,2-diaminocyclohexane is purged in the make stream of the purge column. If desired, the recovered hexamethylenediamine can be recycled to the foreshots column when it is not sufficiently pure. Usually, however, the hexamethylenediamine in the tails of the purge column is returned to the intermediates column.

Accordingly, the refining column operates on the tails from the intermediates column. In the refining column the hexamethylenediamine has the high-boiling impurities removed therefrom as tails. Among such impurities are the half-hydrogenation product, epsilon-aminocapronitrile, and most of the high-boiling polarographically reducible impurities. The low-boiling polarographically reducible impurities, however, distill over with the hexamethylenediamine. Thefore, in order to insure practically complete removal of the low-boiling impurities, it is necessary to insert a hold-up capacity vessel in the refining system at that point where such impurities are present in their highest concentration. This point occurs as the hexamethylenediamine leaves the refining column at which point it passes through a vapor line to a condenser and then to a reflux line which leads back to the top of the refining column. Accordingly, the reflux return line thereof is equipped with a hold-up capacity vessel from which the hexamethylenediamine is returned as reflux once more to the refining column. Since this process is a continuous one, part of the refined hexamethylenediamine may be led to storage tanks from the condenser and part may be returned directly from the condenser to the top of the column as reflux while the remainder is led to the hold-up capacity vessel.

The conversion of low-boiling polarographically reducible impurities in the hexamethylenediamine containing a high concentration of low-boiling polarographically reducible impurities depends upon a plurality of interrelated factors. For example, the time period during which the hexamethylenediamine is held in the hold-up capacity vessel and the temperature in the vessel both affect the conversion. Generally, there is no upper limit on the length of time during which the refined hexamethylenediamine containing the high concentration of low-boiling polarographically reducible impurities is held in the hold-up capacity vessel. The total time of the hold-up period is limited only by the practicality of efficient operation. However, a hold-up time of at least 15 minutes is necessary in order to get an appreciable conversion of the low-boiling polarographically reducible impurities to high-boiling polarographically reducible impurities. It is preferred, however, that the hold-up time cover a period of from 1 to 2 hours in order to operate efficiently and still produce a highly pure product. Since equilibrium between the high-boiling polarographically reducible impurities and the low-boiling polarographically reducible impurities is encouraged in the liquid phase, the temperature in the hold-up capacity vessel must be maintained with a range from the melting point of hexamethylenediamine to the boiling point of hexamethylenediamine. Preferably, the temperature in the hold-up capacity vessel is held within a range of 100° C. to 110° C. in the interest of efficient and economic practicality while at the same time permitting optimum conversion of low-boiling polarographically reducible impurities to high-boiling polarographically reducible impurities.

The following examples are intended to illustrate the present invention more fully but are not to be construed as limiting the scope thereof, for it is possible to effect many modifications therein.

*Example I*

A hexamethylenediamine refining train consisting of a foreshots column, intermediates column, purge column and refining column was primed with crude hexamethylenediamine which had been preheated to 190° C. The temperature in the base of the foreshots column was approximately 200° C. and the temperature in the top of the column was about 100° C. Ammonia and low-boiling materials, such as water and hexamethyleneimine were passed out the top of the foreshots column to a condenser from which the ammonia is recovered and the low-boiling materials were condensed and discarded. The foreshots column tails were fed to the intermediates column which is connected in series to the purge column in each of which a head temperature of about 98° C. and a pressure of 20 mm. of mercury were maintained. Here a portion of the diamine containing some of the 1,2-diaminocyclohexane was taken off as heads and fed to the purge column. The tails from the intermediates column containing relatively pure hexamethylenediamine were led directly to the refining column wherein a head temperature of 113° C. and a pressure of about 42 mm. of mercury is maintained. In the purge column the hexamethylenediamine is separated from the 1,2-diaminocyclohexane by concentrating the 1,2-diaminocyclohexane in the heads of the purge column. The tails from the purge column were then led back to the intermediates column and from there to the refining column. In the refining column, the hexamethylenediamine was distilled over the top of the column, passed through a vapor line to a condenser where it was condensed, and a portion returned to the upper section thereof by means of a reflux line while the remainder was taken off as refined hexamethylenediamine. A series of polarograph tests on the refiner feed, refiner tails and refined product indicated polarographically reducible impurities in each. The concentrations of such impurities are set forth in the following table.

TABLE I

| Stream | Polarographically Reducible Impurities (mols per million mols) |
|---|---|
| Refiner Feed | 4,233 |
| Refiner Tails | 15,368 |
| Refined Hexamethylenediamine | 843 |

The above data show that although a large part of the polarographically reducible impurities, namely high-boiling polarographically reducible impurities, are removed by known methods of purification, a considerable amount of polarographically reducible impurities are distilled over with refined hexamethylenediamine. The polarographically reducible impurity calculations were made on a dropping mercury electrode polarograph at 1.3 to 1.5 volts which had been calibrated with heptaldehyde, one mol of which is equivalent to 1 mol of polarographically reducible impurity.

*Example II*

The system of Example I was equipped with a hold-up capacity vessel in the reflux line of the refining column. The system was operated alternately with a reflux hold-up period, a normal reflux period in which the hold-up vessel was bypassed, and a further reflux hold-up period. During the reflux hold-up period, the hold-up capacity vessel was maintained at a temperature of about 90 to 110° C. by use of a steam jacket. The hold-up time was two hours. Analyses of polarographically reducible impurities were calculated as in the foregoing example and are set out in the table below.

TABLE II

| Time in Hours | Type Reflux | Refined Hexamethylenediamine Analyses of Polarographically Reducible Impurities (mols per million mols) |
|---|---|---|
| 0 | Reflux Hold-up Started | |
| 1 | do | 82 |
| 2 | do | 93 |
| 3 | do | 78 |
| 4 | do | 98 |
| 5 | do | 95 |
| 6 | do | 81 |
| 7 | do | 94 |
| 8 | do | 60 |
| 9 | do | 69 |
| 10 | do | 73 |
| 11 | do | 83 |
| 12 | do | 68 |
| 13 | Normal Reflux Started | 97 |
| 14 | do | 182 |
| 15 | do | 296 |
| 16 | do | 308 |
| 17 | do | 332 |
| 18 | Reflux Hold-up Started | 440 |
| 19 | do | 42 |
| 20 | do | 41 |
| 21 | do | 61 |
| 22 | do | 44 |
| 23 | do | 54 |
| 24 | do | 44 |
| 25 | do | 66 |
| 26 | do | 66 |
| 27 | do | 66 |

The data above clearly show that use of the hold-up capacity vessel permits removal of low-boiling polarographically reducible impurities by their conversion to high-boiling polarographically reducible impurities. Furthermore, normal refluxing shows a high count of polarographically reducible impurities remaining in the refined hexamethylenediamine.

The present invention presents many advantages over presently employed methods of hexamethylenediamine refinement. It results in the preparation of hexamethylenediamine having greatly improved purity by reducing polarographically reducible impurities to negligible amounts. Furthermore, no great procedural changes in the preparation of hexamethylenediamine are necessary and the hold-up capacity vessel can be inserted in present hexamethylenediamine refining systems without great change or expense. The highly purified hexamethylenediamine prepared in accordance with the product of the instant invention obviates quality problems encountered in industry where hexamethylenediamine is employed in producing commercial items, such as polyhexamethyleneadipamide and the like. Numerous other advantages of this invention will be apparent to those skilled in the art from reading the instant description.

As many apparently widely different embodiments of this invention may be made without departing from the spirit and scope thereof, it is to be understood that the same is not to be limited to the specific embodiments thereof, except as defined in the appended claims.

We claim:

1. In the continuous process for purifying refined hexamethylenediamine wherein hexamethylenediamine is distilled in a distillation zone and the resulting vaporous hexamethylenediamine is condensed with part of the condensed hexamethylenediamine being returned for redistillation as reflux and another part of the condensed hexamethylenediamine being collected as final product, the improvement comprising the steps of retaining the remainder of the condensed hexamethylenediamine in a hold-up zone at a temperature between the melting point and the boiling point of hexamethylenediamine for a period of time of at least 15 minutes whereby the low-boiling polarographically reducible impurities in the condensed hexamethylenediamine are converted to high-boiling polarographically reducible impurities, and thereafter returning the hexamethylenediamine from the hold-up zone to the said distillation zone as reflux for redistillation thereof.

2. In the continuous process for purifying refined hexamethylenediamine wherein hexamethylenediamine is distilled in a distillation zone and the resulting vaporous hexamethylenediamine is condensed with part of the condensed hexamethylenediamine being returned for redistillation as reflux and another part of the condensed hexamethylenediamine being collected as final product, the improvement comprising the steps of retaining the remainder of the condensed hexamethylenediamine in a hold-up zone at a temperature between the melting point and the boiling point of hexamethylenediamine for a period of time of about 1-2 hours whereby the low-boiling polarographically reducible impurities in the condensed hexamethylenediamine are converted to high-boiling polarographically reducible impurities, and thereafter returning the hexamethylenediamine from the hold-up zone to the said distillation zone as reflux for redistillation thereof.

3. In the continuous process for purifying refined hexamethylenediamine wherein hexamethylenediamine is distilled in a distillation zone and the resulting vaporous hexamethylenediamine is condensed with part of the condensed hexamethylenediamine being returned for redistillation as reflux and another part of the condensed hexamethylenediamine being collected as final product, the improvement comprising the steps of retaining the remainder of the condensed hexamethylenediamine in a hold-up zone at a temperature between 90° C. and 110° C. for a period of time of about 1–2 hours whereby the low-boiling polarographically reducible impurities in the condensed hexamethylenediamine are converted to high-boiling polarographically reducible impurities, and thereafter returning the hexamethylenediamine from the hold-up zone to the said distillation zone as reflux for redistillation thereof.

References Cited in the file of this patent

UNITED STATES PATENTS

| | | |
|---|---|---|
| 2,542,315 | Eickmeyer | Feb. 20, 1951 |
| 2,766,303 | Bennett et al. | Oct. 9, 1956 |
| 2,802,030 | Ashby | Aug. 6, 1957 |
| 2,840,606 | Miller | June 24, 1958 |
| 2,889,256 | Campbell | June 2, 1959 |